F. SCHRAMLING, Sr., & E. S. DAY.
Oatmeal-Machine.

No. 203,652. Patented May 14, 1878.

UNITED STATES PATENT OFFICE.

FREDERICK SCHRAMLING, SR., AND EUGENE S. DAY, OF SABULA, IOWA, ASSIGNORS TO THEMSELVES AND JOSEPH C. DAY, OF SAME PLACE.

IMPROVEMENT IN OATMEAL-MACHINES.

Specification forming part of Letters Patent No. 203,652, dated May 14, 1878; application filed January 14, 1878.

*To all whom it may concern:*

Figure 1:
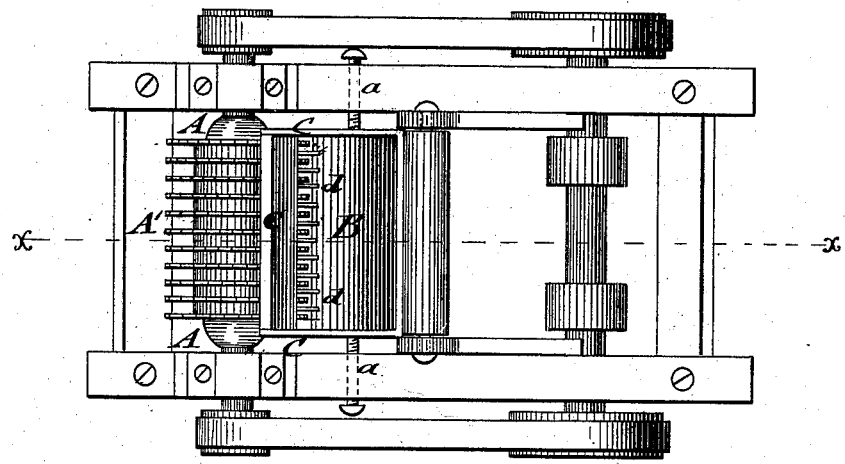
Figure 2:
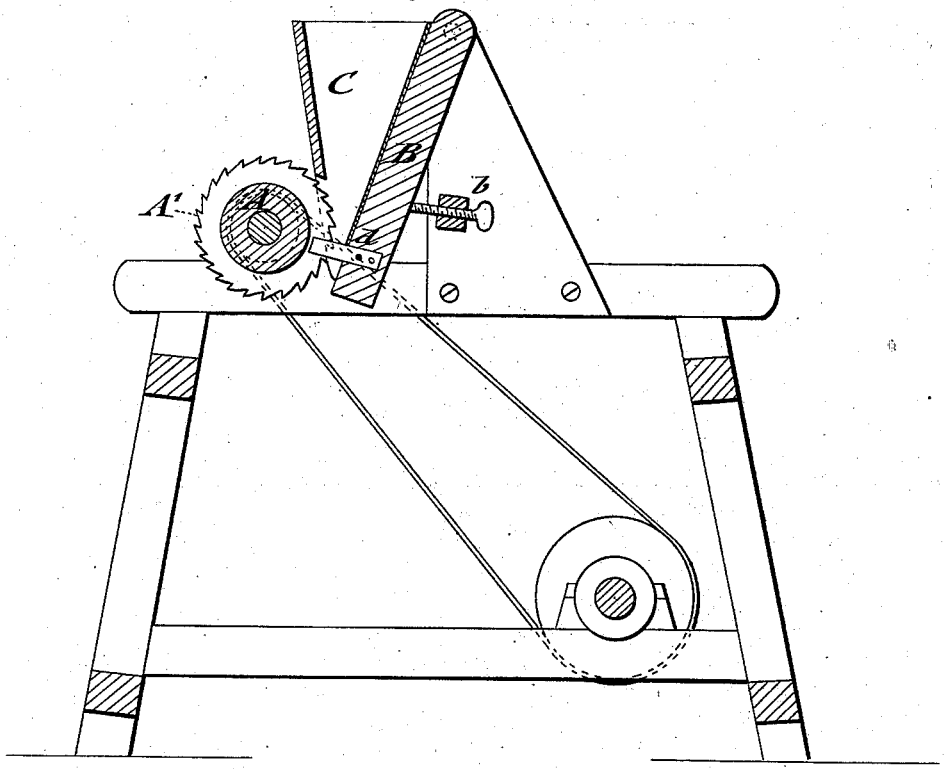

Be it known that we, FREDERICK SCHRAMLING, Sr., and EUGENE S. DAY, of Sabula, county of Jackson, State of Iowa, have invented a new and Improved Grain-Cutter, of which the following is a specification:

In the accompanying drawing, Figure 1 represents a top view, and Fig. 2 a vertical longitudinal section on line $x\ x$, Fig. 1, of our improved grain-cutter.

Similar letters of reference indicate corresponding parts.

The invention will first be described in connection with the drawing, and then pointed out in the claim.

Referring to the drawing, A represents a revolving cylinder, on which a gang of cutting saws or knives, A', is arranged, with the saws or knives at suitable distances from each other. The saws or knives act upon the oats or other grains as they are fed along an inclined plate, B, that is pivoted at the upper end to side standards of the supporting-frame, and acted upon at the lower end by side clamping-screws $a$ and a rear adjusting-screw, $b$. The adjustable plate B is provided with a feed-hopper, C, that is attached thereto, and at the lower part with concave teeth $d$, that project from the plate into the spaces between each saw, for the purpose of exposing the grains as they pass down successively and in effective manner to the cutting action of the saws or knives.

The plate B, being pivoted at the top, may be readily brought into any degree of proximity to the rotary cutters, so that the latter will bring down the oats with such force across two or more of the clearer-teeth as to break the grains into pieces and loosen the hulls, the latter being then removed by friction along the lateral portion of the concave cleaners. This allows the oat substance and the hulls to be delivered by means of a fan or blower into separate receptacles.

We are aware that it is not new to cut the grains by passing them between rotary and stationary knives; but we first cut the grains against the plate B before they reach the concave teeth $d$, which serve, in conjunction with the moving cutters, to strip off the hulls, thus performing by one operation the cutting and cleaning of the grain.

What we claim is—

The combination of the rotary cutters A', the adjustable pivoted plate B, having concave teeth $d$ set below the axis of the cutters, and the hopper C, to cut and hull the grains at one operation, in the manner specified.

FREDERICK SCHRAMLING, SR.
EUGENE SUE DAY.

Witnesses:
J. HILSINGER,
J. D. SMITH.